United States Patent
Tondorf et al.

(10) Patent No.: US 6,272,766 B1
(45) Date of Patent: Aug. 14, 2001

(54) LENGTH MEASURING INSTRUMENT, AND MACHINE HAVING A LENGTH MEASURING INSTRUMENT

(75) Inventors: Sebastian Tondorf, Waging; Bernhard Falkinger, Nussdorf, both of (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/178,214

(22) Filed: Oct. 23, 1998

(30) Foreign Application Priority Data

Oct. 27, 1997 (DE) .............................. 197 47 356

(51) Int. Cl.$^7$ .............................. G01B 11/04; G01B 5/04
(52) U.S. Cl. .................................. 33/809; 33/706
(58) Field of Search ................. 33/706, 707, 708, 33/783, 809, 810, 811, 512

(56) References Cited

U.S. PATENT DOCUMENTS 4,988,244   1/1991   Sheldon et al. .................. 409/132
5,354,158   10/1994  Sheldon et al. .................. 409/201
5,758,427   6/1998   Feichtinger et al. ............. 33/1 PT

FOREIGN PATENT DOCUMENTS 25 05 587    10/1977  (DE) .
31 13 962    10/1982  (DE) .
0 762 082    12/1995  (EP) .
WO 91/03145  3/1991   (WO) .

Primary Examiner—Christopher W. Fulton
(74) Attorney, Agent, or Firm—Brinks Hofer Gilson & Lione

(57) ABSTRACT

A length measuring instrument having a scale which can be scanned by a scanner device is provided. The scale is rotatably supported in an end region about the measurement axis X by a pivot bearing. The scanner device is guided on the scale so that rotations of the scanner device are transmitted to the scale. A length measuring instrument of this can be used especially advantageously in telescoping arms of a hexapod machine.

15 Claims, 9 Drawing Sheets

IV-IV

US 6,272,766 B1

LENGTH MEASURING INSTRUMENT, AND MACHINE HAVING A LENGTH MEASURING INSTRUMENT

FIELD OF THE INVENTION

The invention relates to a length measuring instrument for measuring the relative position of two objects and, more particularly, to a machine with a length measuring instrument that has a scale rotatably supported by a pivot bearing and a scanner device guided on the scale so that rotations of the scanner device are transmitted to the scale.

BACKGROUND OF THE INVENTION

German Patent Publication No. DE 25 05 587 C3 discloses a length measuring instrument in which a scale is secured by an angle bracket to one of the objects to be measured and a scanner device is secured to the second object by a mounting foot. The angle bracket has a weak point in the form of a groove. The angle bracket allows a rotary motion of the scale about an axis at right angles to the measurement direction. To compensate for inaccuracies of guidance, a coupling is provided between the mounting foot and the scanner device. The scanner device is guided on the scale.

German Patent Publication No. DE 31 13 962 A1 discloses a length measuring instrument that is rotatably supported about its longitudinal axis while it is being mounted. During measurement operation, rotatability is precluded since the ends are fixed in the final mounted position.

International Patent Application WO 91/03145 A1 describes a machine, such as a hexapod having telescoping arms. The relative location of two machine parts can be varied by the plurality of telescoping arms. The relative location can be determined by the instantaneous length of the telescoping arms. To that end, one length measuring instrument is provided in each telescoping arm. It comprises a rodlike round scale and a scanner unit.

SUMMARY OF THE INVENTION

An object of the invention is to provide a length measuring instrument with which the spacing between two parts can be measured in a simple way, the two parts being capable of rotating relative to one another about the measurement axis during operation.

Advantages attained with the invention are, in particular, a stable design, high measuring accuracy, and thermally favorable behavior.

An object of the invention is also to disclose a machine having at least one telescoping arm between two machine bodies in which the pulled-out length of the telescoping arm can be measured with a compact, high-precision length measuring instrument.

DESCRIPTION OF THE PREFERRED EMBODIMENTS

Figure 1:
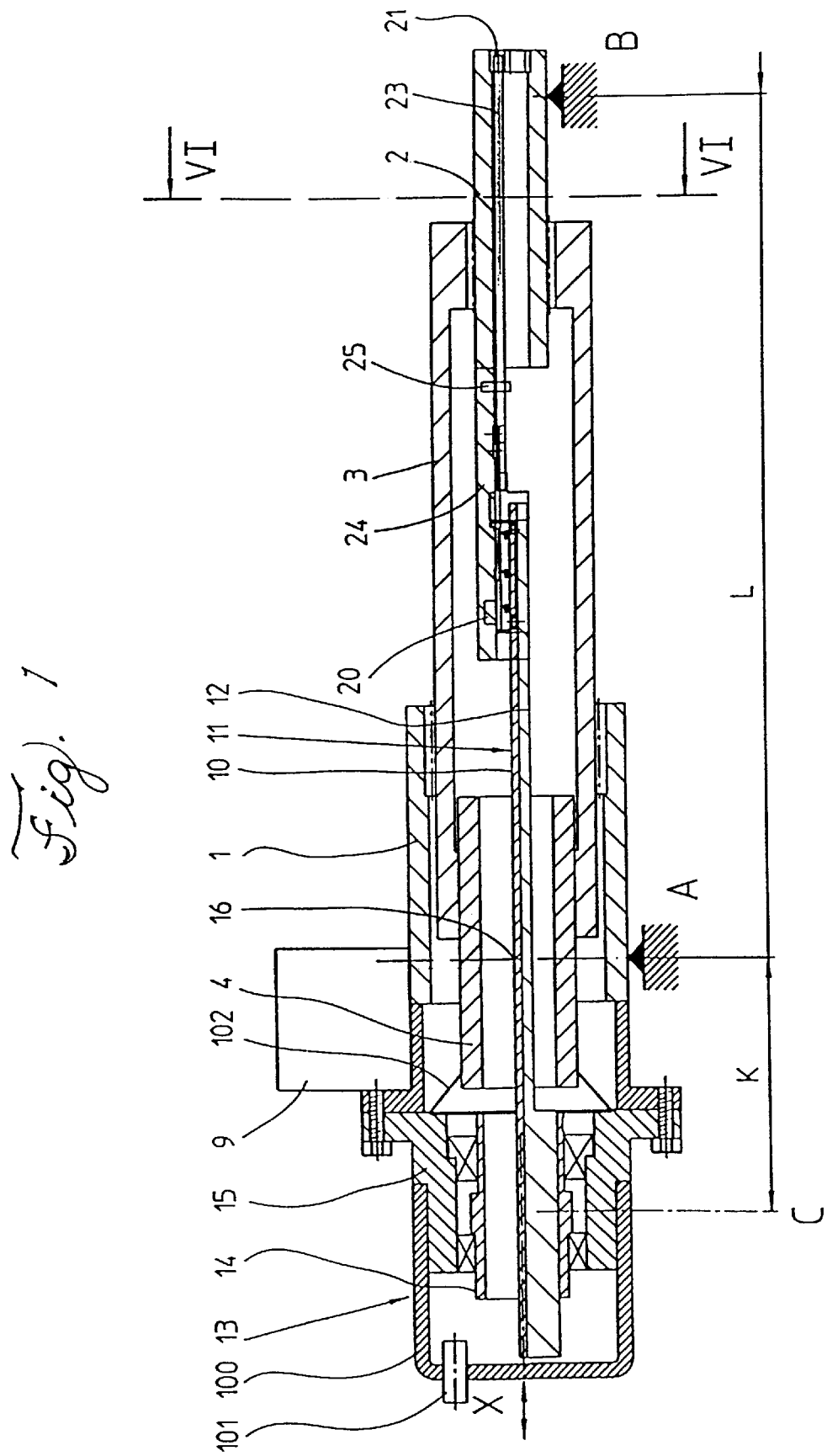
FIG. 1 shows a telescoping arm with a length measuring instrument in the pulled-out state.

In FIG. 1, a telescoping arm with an integrated length measuring system is shown. The telescoping arm comprises at least two, and in the example, three telescoping members 1, 2, 3 that can be displaced one inside the other. The mutual displacement of the two outer telescoping members 1, 2 can be effected hydraulically or by a motor-driven splined shaft 4 as is well known to those of ordinary skill in the art. Upon a rotation of the splined shaft 4, the two outer telescoping members 1 and 2 are displaced toward or away from one another in the measurement direction X, depending on the direction of rotation.

Figure 2:
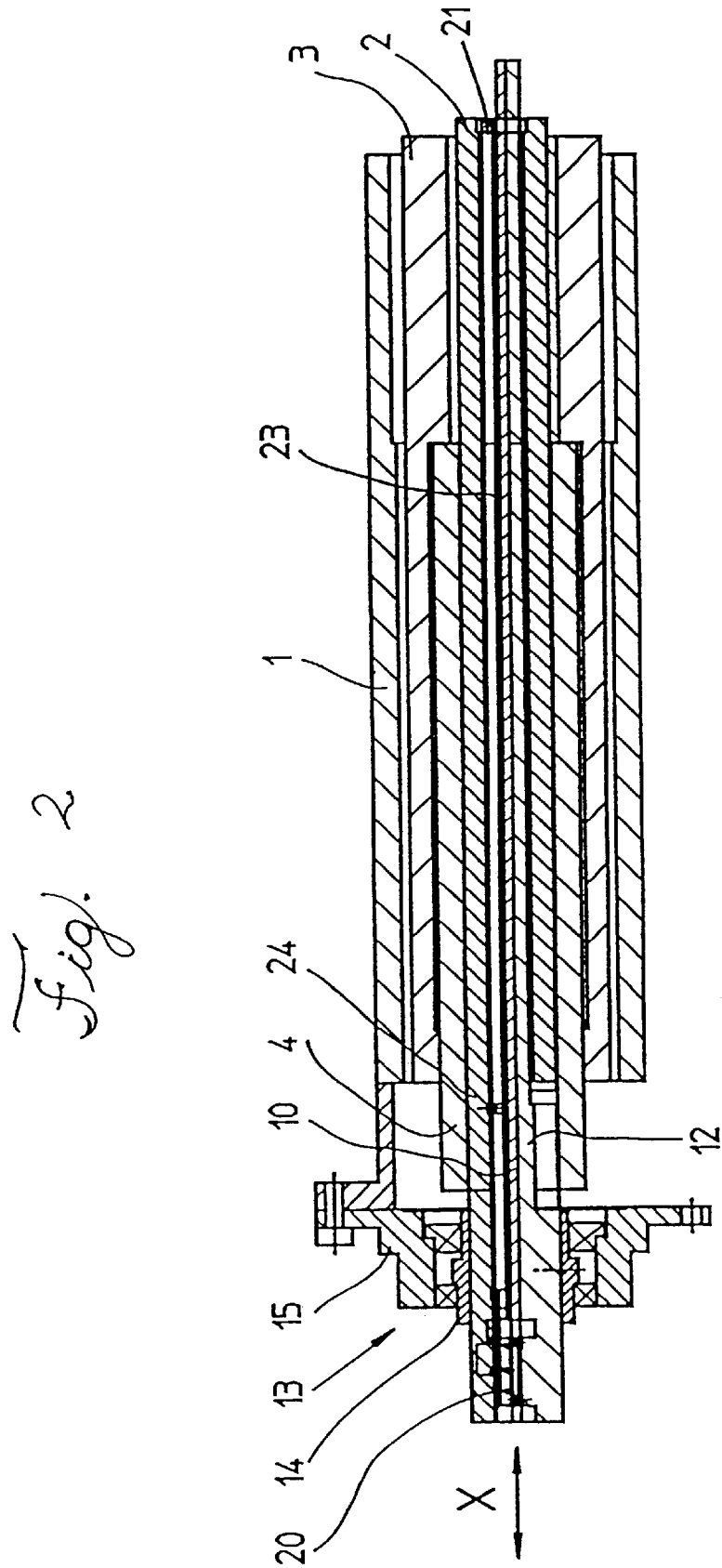
FIG. 2 shows the telescoping arm of FIG. 1 in its retracted state.
Figure 10:
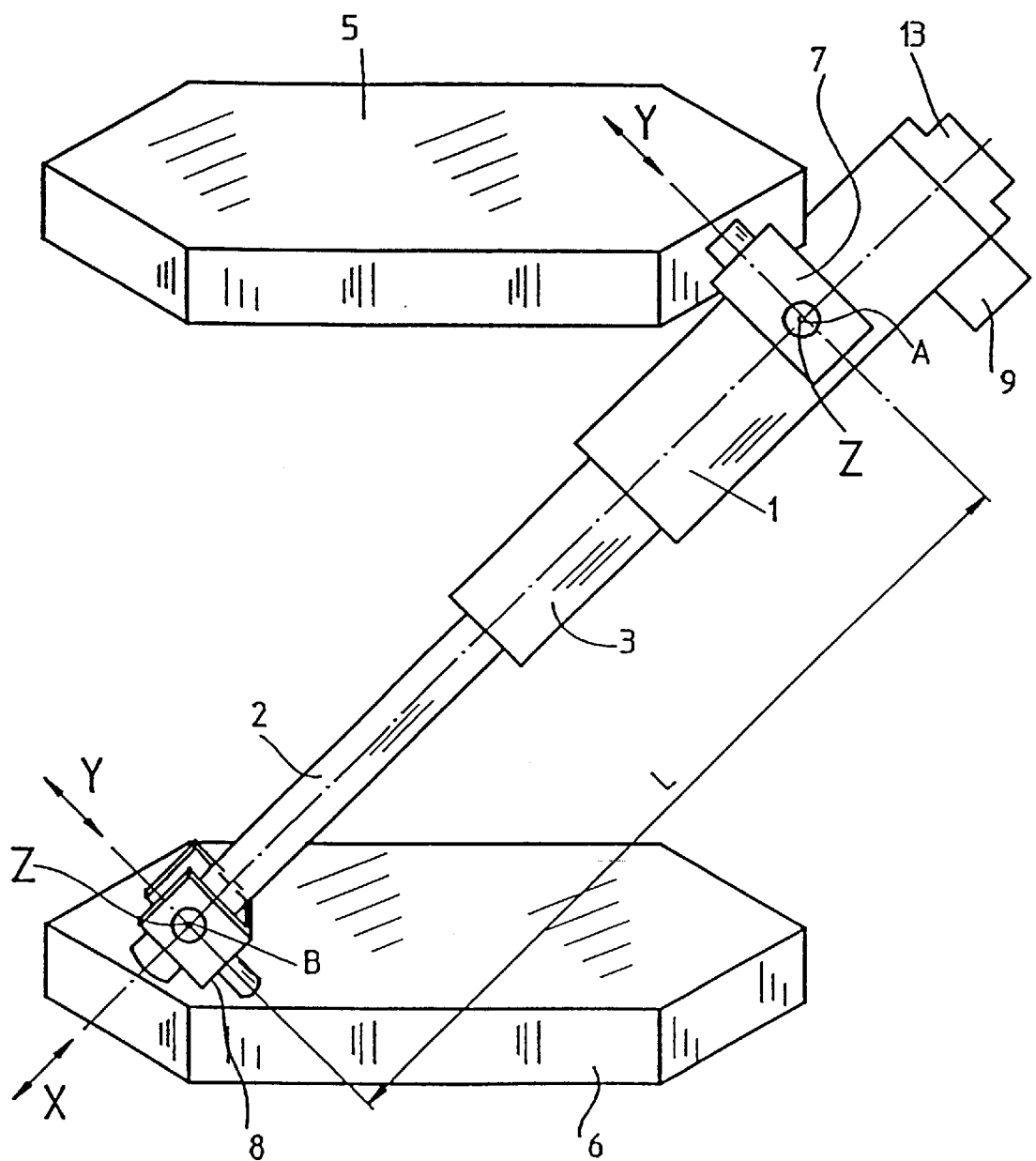
FIG. 10 illustrates the principle of a hexapod machine.

In FIG. 2, the telescoping arm is shown with the length measuring instrument integrated in it, in its retracted state. Such telescoping arms are known in the art and are employed, for example, in hexapod machines (FIG. 10), in which two platforms 5, 6 are moved relative to one another by a plurality of telescoping arms. The principle of a hexapod machine is shown in FIG. 10. For the sake of simplicity, only one of the six telescoping arms between the two platforms 5, 6 is shown. The design of a hexapod machine is especially simple if the first telescoping member 1 is secured to the first platform 5 by a cardan joint 7, such that it is angularly movable with two degrees of freedom but is fixed against relative rotation about the longitudinal axis or measurement direction X, and if the second telescoping member 2 is secured to the second platform 6, also by a cardan joint 8, such that it is angularly movable with two degrees of freedom but is fixed against relative rotation about the longitudinal axis or measurement direction X. In FIG. 10, the cardan joints 7, 8 are shown only schematically. Each of the two telescoping members is supported rotatably on the respective platforms 5, 6 by the cardan joints 7, 8 about the first axis Y and the second axis Z. The two axes Y and Z extend at right angles to one another, and Z extends at right angles to the longitudinal axis or measurement direction X of the telescoping arm. Economical bearing without play is achieved by using cardan joints 7, 8.

The platform 5 is moved relative to the platform 6 by six such telescoping arms, for example. In these motions, a rotation of one telescoping member relative to the other telescoping member 2 about the longitudinal axis or measurement direction X is also possible. In the example, where three telescoping members 1, 2, 3 are used, this rotation is made possible by the supporting, rotatably, of the two telescoping members 1, 2 on the middle telescoping member 3, which is driven by a motor 9 and the splined shaft 4 as is well known.

To detect the exact location of the platform 5 relative to the platform 6, one length measuring instrument is integrated into each of the telescoping arms of the hexapod machine. With the length measuring instrument, the instantaneous pulled-out length of the telescoping arm is measured, that is, the distance L between the fastening points A and B.

The length measuring instrument is built into the hollow space in the telescoping arm, and thus the installation space is limited by the diameter of the telescoping members 1, 2, 3. The inner cylindrical faces of the telescoping members 1, 2 and the outer end faces are available as mounting faces for fastening the length measuring instrument.

The length measuring instrument comprises a scale 10 (FIG. 1) of glass or glass ceramic, with a rectangular cross section. An incremental division 11 is placed on a flat surface of the scale 10 and is scanned photoelectrically in a manner known by a scanner device 20. The division 11 preferably is formed by alternatingly reflective and nonreflective regions (not shown), which are illuminated by a light source (not shown) of the scanner device 20. The beams reflected by the division 11 are detected by photodetectors (not shown) of the scanner device 20, and position-dependent electrical scanning signals are generated from this and delivered to an evaluation device (not shown) in which the current distance L is ascertained.

The scale 10 is secured to a scale carrier 12. At measurement reference point A, the scale 10 is secured rigidly to the scale carrier 12, or in other words immovably in the measurement direction X. In the remaining region, the scale 10 is supported elastically by an adhesive layer or a viscous film of liquid, such as oil (not shown), so that it is movable translationally on the scale carrier 12 and is thus decoupled from the scale carrier 12. For the rigid fixation of the scale 10 at the measurement reference point A, a solid hardening adhesive preferably can be used. Another possibility is for the center of the scale 10 to coincide with the measurement reference point A, then the scale 10 can be supported elastically over its entire length on the scale carrier 12, since the measurement reference point then necessarily comes to be located in the center of the scale 10.

The scale carrier 12 is secured to the outer end of telescoping member 1 by a fastening element in the form of a pivot bearing 13. The pivot bearing 13 includes an inner ring 14 to which the scale carrier 12 is rigidly secured, and an outer ring 15, which is rotatable relative to the inner ring 14 and is rigidly coupled to the telescoping member 1 and thus to the measurement reference point A, for example, being screwed thereto. The pivot bearing 13 thus supports the scale carrier 12 in an end region C rigidly with five degrees of freedom relative to the outer ring 15 and is rotatably and largely play-free about the longitudinal axis or measurement direction X. The remaining region of the scale carrier 12 is supported to be translationally movable (that is, in the measurement direction X). The scale carrier 12 is rigidly joined, for example screwed, to the inner ring 14 of the pivot bearing 13 in the end region C.

To attain a compact design, it is advantageous if the pivot bearing 13 and thus the end region C are spaced apart from the measurement reference point A. In order for the distance K not to negatively impact on the measurement of the distance L, it is advantageous if the portion of the scale carrier 12 between the points C and A has the same coefficient of thermal expansion as the connecting piece from the outer ring 15 to the telescoping member 1 between the points C and A. Changes in length between A and C that are caused by temperature changes are thus compensated for.

The coefficient of expansion of the scale 10 is virtually zero, so that the distance between points A and B can be measured as independently of temperature as possible.

The rotatable unit comprising the inner ring 14, scale carrier 12 and scale 10 is balanced, so that during the rotation about the longitudinal axis or measurement direction X no impermissible torsional forces will be exerted on the pivot bearing 13 in the scale 10.

Figure 3:
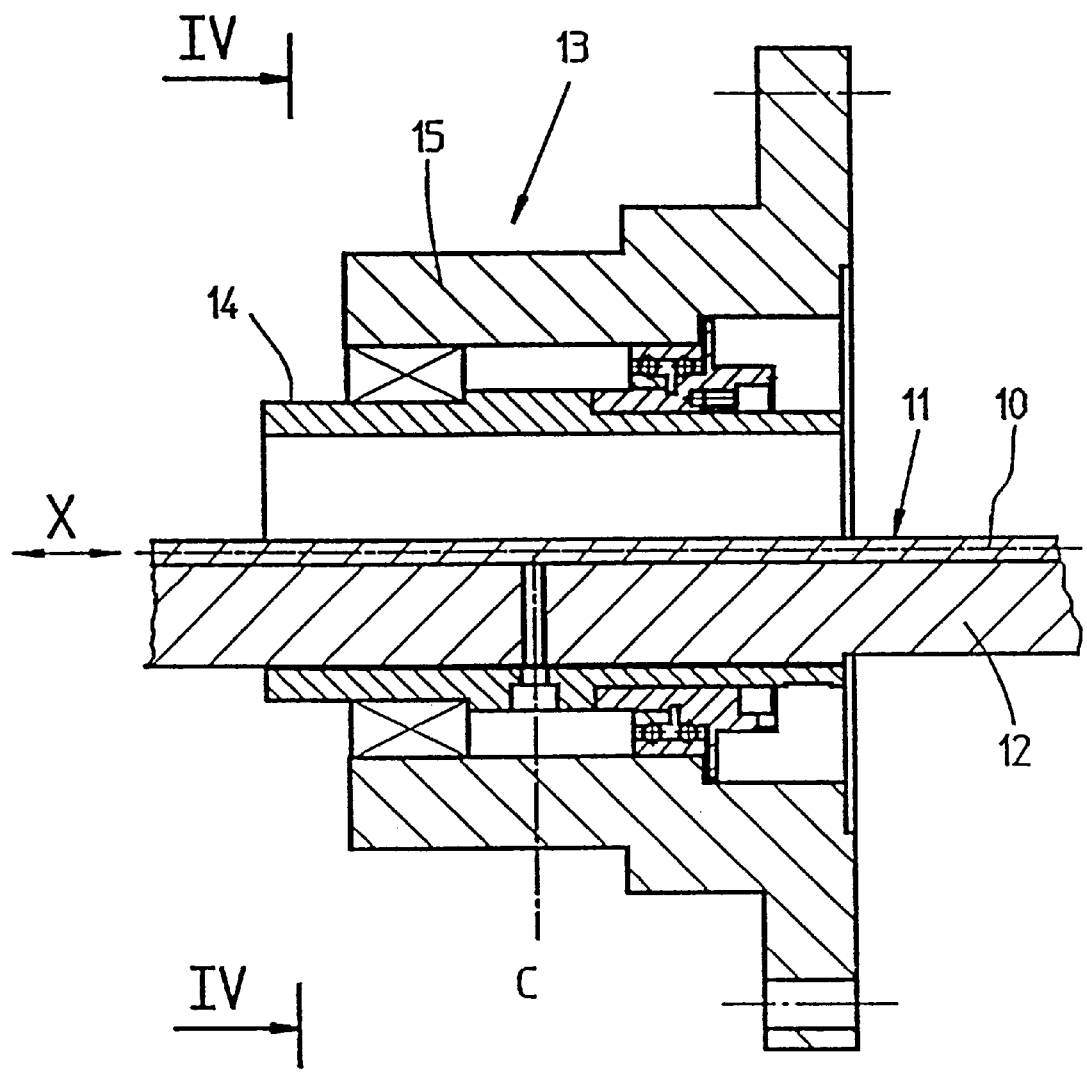
FIG. 3 is an enlarged detail of the length measuring instrument of FIG. 1.
Figure 4:
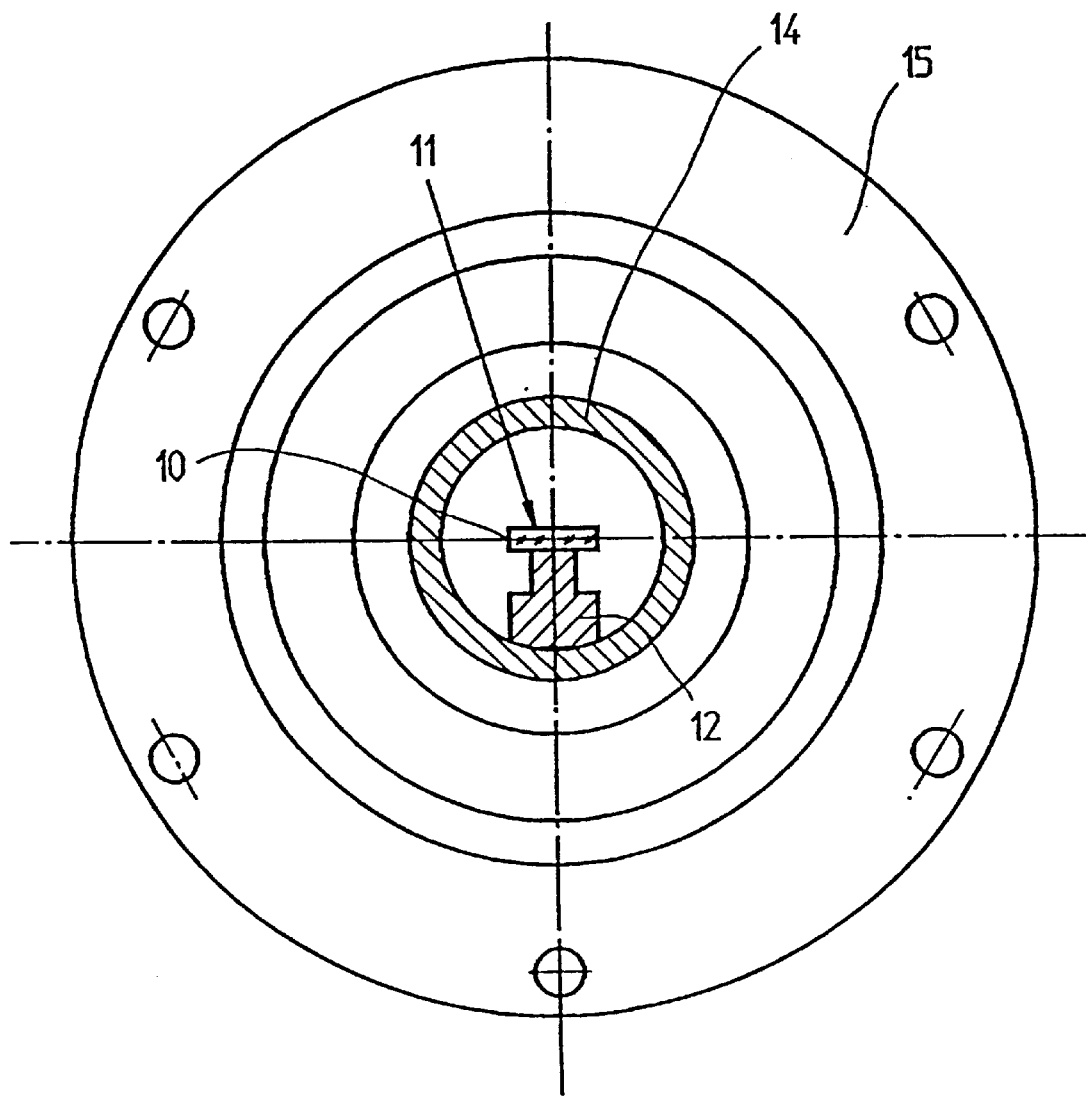
FIG. 4 is a section taken along the line IV—IV of the length measuring instrument in FIG. 3.

In FIG. 3, the region of the pivot bearing 13 is shown on a larger scale, and FIG. 4 shows a section IV—IV through the pivot bearing 13 of FIG. 3. The pivot bearing 13 may be a ball bearing, roller bearing, or needle bearing, for example.

With reference to FIGS. 1 and 2, on the accessible end of the telescoping member 2, the scanner device 20 is secured by a fastening element 21 via a coupling rod 23. The length of the coupling rod 23 from the fastening element 21 to the scanner device 20 is equivalent to at least the requisite measurement length and thus the length of the scale 10. The coupling rod 23 is mounted rigidly on the telescoping member 2 solely in the region of the accessible end of the telescoping member 2, while in its remaining region it is translationally (in the measurement direction X) decoupled from the telescoping member.

The coefficient of thermal expansion of the coupling rod 23 is virtually zero, so that the position measurement can be performed independently of temperature changes.

It is advantageous if the scanner device 20 is supported in directions transverse to the longitudinal axis or measurement direction X on the telescoping member 2 and/or a mount 24 secured to it. This mount can be embodied in the form of suspension means 25 (see FIG. 5).

Figure 5:
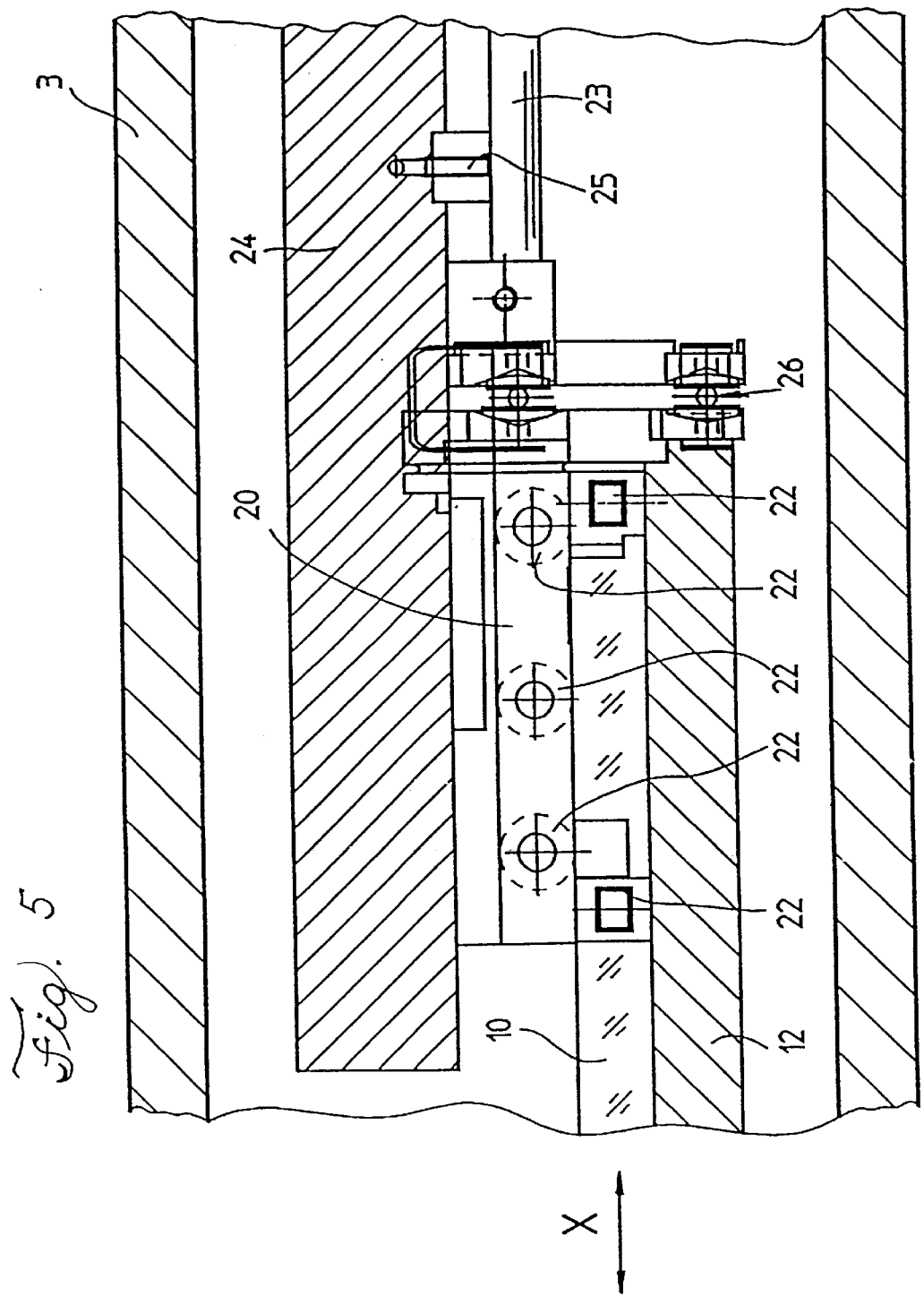
FIG. 5 shows the scanner device of the length measuring instrument of FIG. 1 in detail.

In FIG. 5, the region of the scanner device 20 of the length measuring instrument is shown on a larger scale. The scanner device 20 is secured to the coupling rod 23 via a coupling 26 which is known per se. This coupling 26 is rigid in the longitudinal axis or measurement direction X and in directions transverse to it is resilient in small regions. Rotations of the telescoping member 2 about the measurement axis X are transmitted by the coupling rod 23, via the coupling 26, to the scale carrier 12 and thus to the scale 10. To assure this transmission, a guide 22 is provided between the scanner device 20 and the scale 10 and/or the scale carrier 12. In a preferred embodiment, as shown, this guide is embodied as a roller guide with ball bearings 22. The ball bearings 22 are secured to the scanner device 20. One ball bearing 22 is braced laterally on the scale 10, and other ball bearings 22 are braced on the surface that extends at right angles thereto and carries the division 11.

Figure 6:
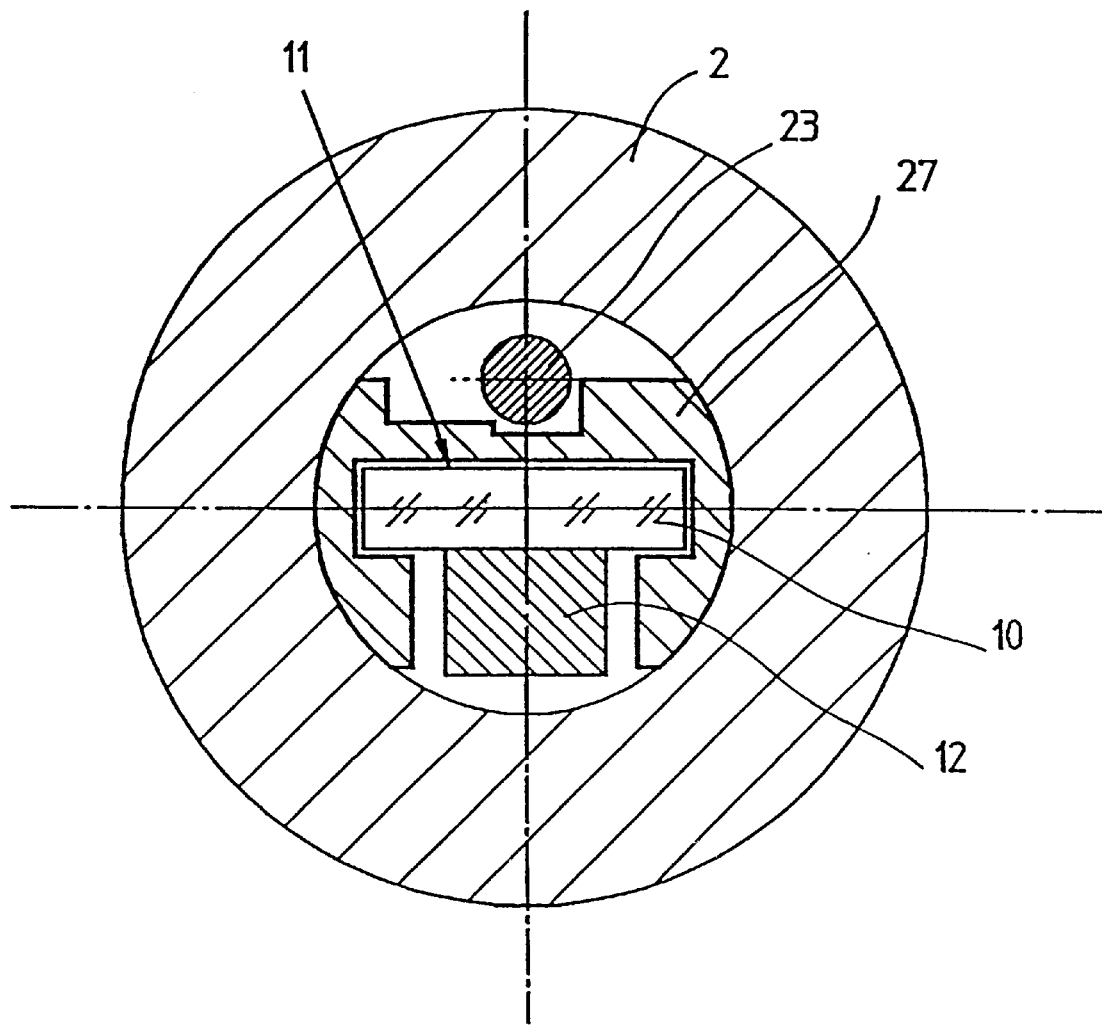
FIG. 6 is a section taken along the line VI—VI of the length measuring instrument in FIG. 1.

For guiding the scale 10 and the scale carrier 12, it is possible alternatively, but in particular in addition, to use a guide part 27 (FIG. 6) which is connected to the telescoping member 2 in a manner fixed against relative rotation. This guide part 27 is not shown in FIGS. 1–5 for the sake of simplicity. FIG. 6 shows a section VI—VI of FIG. 1 on a larger scale, including the guide part 27. The guide part 27 is a plastic rail which is press-fitted into the telescoping member 2. A recess in the plastic rail 27 is adapted to the contour of the scale 10 and/or scale carrier 12 and forms a sliding guide for the scale 10 so as to transmit rotary motions about the longitudinal axis or measurement direction X to the scale 10 and achieve a vibrationally stable construction.

Figure 7:
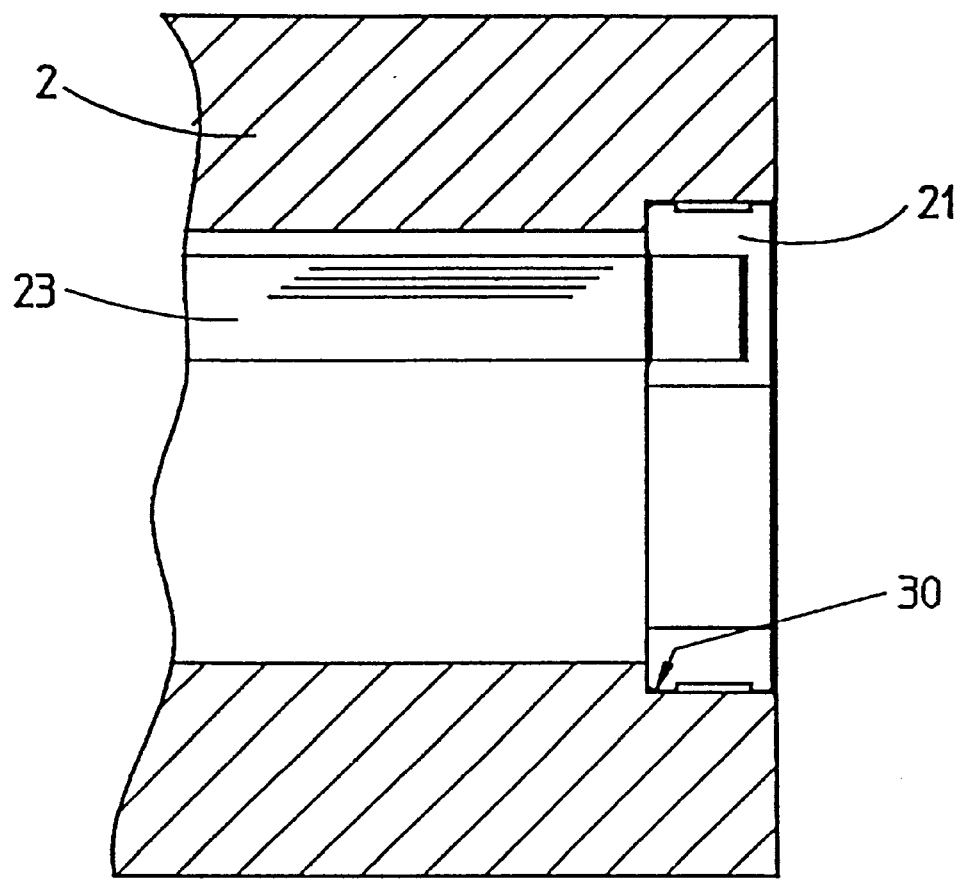
FIG. 7 is an enlarged detail of the length measuring instrument of FIG. 1.
Figure 8:
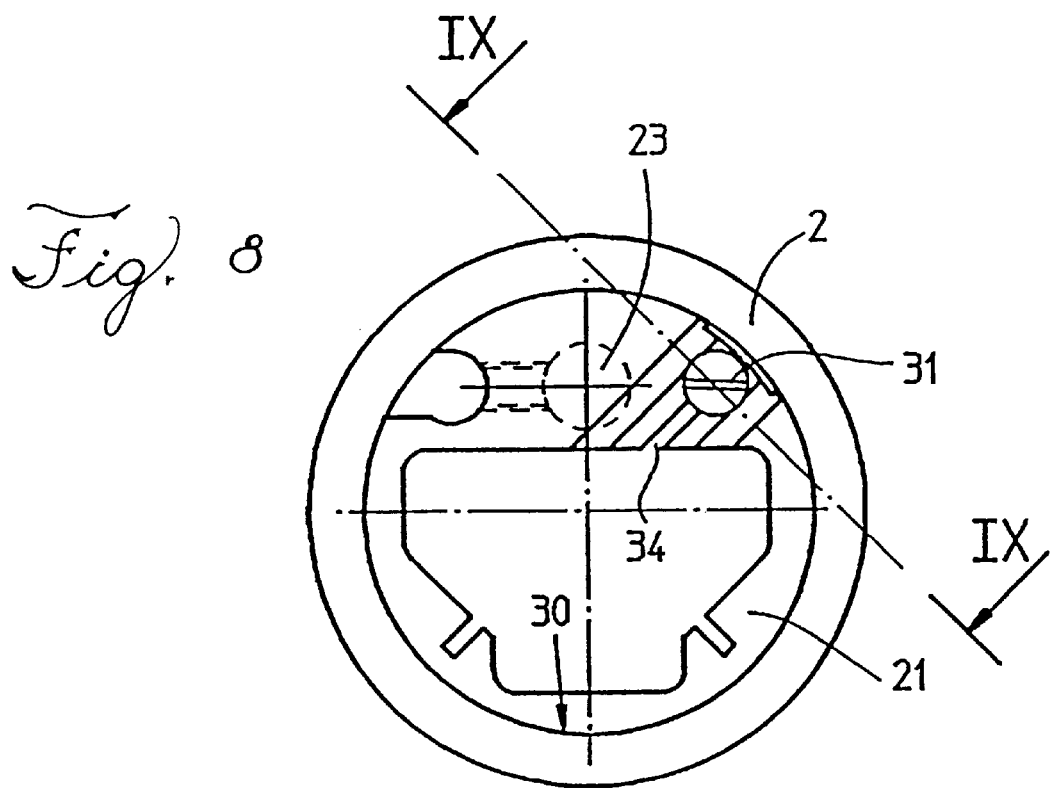
FIG. 8 is a plan view of the end of the length measuring instrument of FIG. 7.
Figure 9:
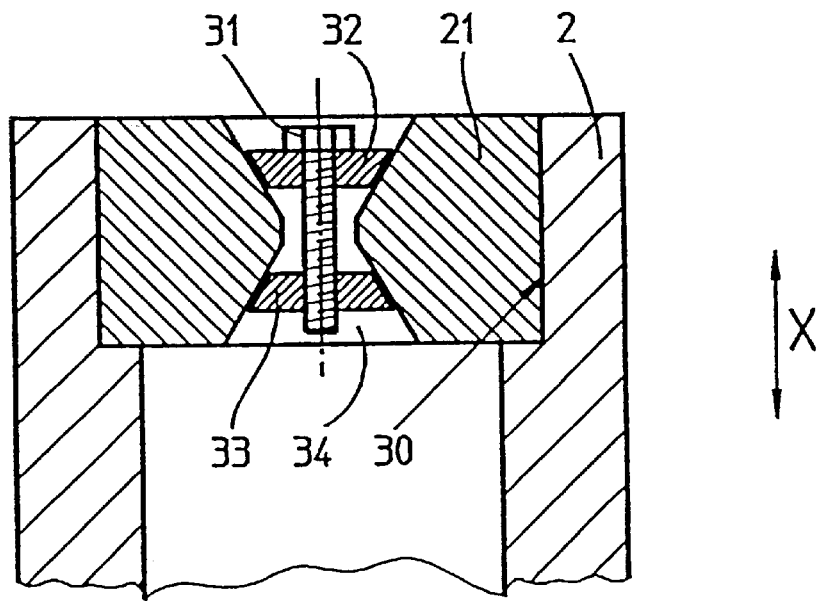
FIG. 9 is a section taken along the line IX—IX of FIG. 8.

In FIGS. 7–9, the fastening element 21 for securing the scanner device 20 to the telescoping member 2 is shown on a larger scale. FIG. 7 shows a cross section and FIG. 8 a plan view on the end of the telescoping member 2. For simple assembly, a spreader element 21 is provided in the form of a clamping ring. The scanner device 20 is secured to this clamping ring 21 via the coupling rod 23. The clamping ring 21 is spread radially apart via an actuating element and radially clamped to an inner cylindrical face 30 of the telescoping member 2. The actuating element may be a screw which is accessible and actuatable axially (in the X direction) and displaces two wedges 32, 33 contrary to one another. The wedges 32, 33 are braced on oblique faces of the clamping ring 21, so that an axial motion of the wedges 32, 33 is converted into a radial motion, thus causing the split clamping ring 21 to be spread open.

FIG. 9 shows a section IX—IX of FIG. 8. The ringlike spreader element 21 has a slit 34. This slit 34 divides the spreader element 21 in such a way that the outer diameter can be increased by the wedges 32, 33. The spreading is effected by means of two wedges 32, 33, disposed in line with one another and spaced apart axially, which have contrary conical surfaces that are braced on corresponding surfaces of the spreader element 21. Rotating the screw 31 pulls the wedges 32, 33 toward one another in the measuring direction X, thus enlarging the slit 34.

The function of the wedges 32, 33 can also be performed directly by thread courses (edges) of a screw, not shown, which is screwed into a thread, extending axially in the slit, of the spreader element and is braced with its head on a face of the spreader element.

In a manner not shown, the spreader element may also be a rigid annular body, in which one or more eccentric screws are rotatably supported. The head of such an eccentric screw has an eccentrically extending circumferential surface, which by rotation comes into contact with the cylindrical face 30 and brings about a radial clamping force between the annular body and the telescoping member 2.

For radially clamping the scanner unit 20 to the inner cylindrical face 30, other constructions may also be employed, for example, European Patent Disclosure EP 0 762 082 A1 expressly incorporated herein by reference.

In a preferred embodiment, an incremental division 11 is mounted on the scale 10; in addition, reference marks, and in particular absolute-coded reference marks may be provided on the scale. The scale may also have only an absolute coding.

In a preferred example, the guide rail 27 (FIG. 6) forms a sliding guide for the scale 10. In a manner not shown, the guide rail may additionally have a roller bearing guide for frictionless bearing of the scale 10. It is also possible, for example, to replace the guide rail 27 with a revolving ball guide.

The length measuring instrument may also have a connection for compressed air. This connection 101 is shown only in FIG. 1 and is provided either in a cover cap 100 or alternatively on the telescoping member 2. What is important is that the compressed air inlet be located in the space of the scale 10, that is, in the measurement space. In FIG. 1, an elastic seal 102 is also provided, for separating the space in which the scale 10 is located from the space in which the drive 9 with the splined shaft 4 is located.

The foregoing description of the preferred embodiments of the present invention has been presented for purposes of illustration and description. It is not intended to be exhaustive or to limit the invention to the precise form disclosed. The embodiments were chosen and described in order to best explain the principles of the invention and its practical application, thereby enabling others skilled in the art to understand the invention for various embodiments and with various modifications as are suited to be particular use contemplated. It is intended that the scope of the invention be defined by the claims appended hereto and their equivalents.

What is claimed is:

1. A length measuring instrument for measuring the distance between a point A of a first object and a point B on a second object along a longitudinal axis, wherein the first object is displaceable relative the second object in the longitudinal axis and rotatable relative to the second object about the longitudinal axis, the length measuring instrument comprising:

a scale with a division, the scale comprising a first fastening element with which the scale is secured to the first object;

a scanner device for scanning the division, the scanner device comprising a second fastening element with which the scanner device is secured to the second object; and guide elements disposed on the scanner device for parallel guidance of the scanner device along the scale;

wherein the first fastening element of the scale comprises a pivot bearing for rotationally moving the scale about the longitudinal axis relative to the first object.

2. The length measuring instrument according to claim 1 wherein the pivot bearing is disposed in an end region of the scale.

3. The length measuring instrument according to claim 2 wherein the scale is supported on a scale carrier such that the scale is transversely movable beginning at point A, and that the scale carrier is rigidly joined at the end region to an inner part of the pivot bearing, and that the pivot bearing comprises an outer part which is freely rotatable relative to the inner part and is used to secure the pivot bearing to the first object.

4. The length measuring instrument according to claim 3 wherein the point A is spaced apart from the end region along the longitudinal axis and that the outer part of the pivot bearing is secured to the first object at the point A.

5. The length measuring instrument according to claim 1 wherein the scanner device is secured to the second fastening element via a coupling rod.

6. The length measuring instrument according to claim 5 wherein the length of the coupling rod is at least approximately equivalent to the length of the scale.

7. The length measuring instrument according to claim 1 wherein the second fastening element comprises a clamp ring which is radially clamped to an inner face of the second object and the clamping ring comprises a spreader element which is spread radially via an actuating element and thereby clamp the clamping ring on the inner face of the second object.

8. The length measuring instrument according to claim 1 wherein the scanner device comprises guide elements which are in contact with the scale so that a rotation of the scanner unit about the longitudinal axis is transmitted to the scale.

9. A machine comprising:

two machine bodies movable relative to one another along a longitudinal axis (X);

at least one telescoping arm between the two machine bodies, the telescoping arm comprising a first telescoping member and a second telescoping member that are displaced relative to one another in the longitudinal axis (X) and rotated about the longitudinal axis (X) relative to one another;

a first cardan joint disposed on the first telescoping member for coupling the first telescoping member relative to the first machine body in an angularly movable manner which however is fixed against relative rotation about the longitudinal axis (X);

a second cardan joint disposed on the second telescoping member for coupling the first telescoping member relative to the second machine body in an angularly movable manner which however is fixed against relative rotation about the longitudinal axis (x);

a length measuring instrument comprising a scale which is coupled to the first telescoping member and comprising a scanner device which is coupled to the second telescoping member; and a pivot bearing disposed between the first telescoping member and the scale for rotationally moving the scale about the longitudinal axis (X) independent of rotation of the first telescoping member during a measurement operation.

10. The machine according to claim 9 wherein the scale is supported on a scale carrier such that the scale is transversely movable beginning at a measurement reference point, and that the scale carrier is rigidly joined at an end region to an inner part of the pivot bearing in the longitudinal axis (X), and that the pivot bearing comprises an outer part which is rotatable relative to the inner part and is secured to a free end of the first telescoping member.

11. The machine according to claim 10 wherein the first telescoping member is connected at the measurement reference point to the first machine body via the first cardan joint.

12. The machine according to claim 10 wherein the end region is spaced apart from the measurement reference point in the longitudinal axis (X), and that the scale carrier and the first telescoping member have a coefficient of thermal expansion that is at least approximately the same between the end region and the measurement reference point.

13. The machine according to claim 9 wherein the scanner device is secured to an end of the second telescoping member via a coupling rod.

14. The machine according to claim 9 wherein the scanner device is radially clamped via a spreader element to an inner face of the second telescoping member.

15. The machine according to claim 9 wherein a guide part, in which the scale is longitudinally guided, is secured to the second telescoping member in a manner fixed against relative rotation.

* * * * *

UNITED STATES PATENT AND TRADEMARK OFFICE
CERTIFICATE OF CORRECTION

PATENT NO. : 6,272,766 B1  Page 1 of 1
DATED : August 14, 2001
INVENTOR(S) : Sebastian Tondorf et al.

It is certified that error appears in the above-identified patent and that said Letters Patent is hereby corrected as shown below:

<u>Column 6,</u>
Line 30, delete "axis and" and substitute -- axis, and -- in its place.
Line 67, delete "(x)" and substitute -- (X) -- in its place.

Signed and Sealed this

Ninth Day of July, 2002

Attest:

JAMES E. ROGAN
Attesting Officer  Director of the United States Patent and Trademark Office